US005959729A

United States Patent [19]
Kodaira et al.

[11] Patent Number: 5,959,729
[45] Date of Patent: Sep. 28, 1999

[54] AUTOMATIC TILT ANGLE COMPENSATOR

[75] Inventors: Jun-ichi Kodaira; Takashi Takahashi; Fumio Ohtomo, all of Tokyo-to, Japan

[73] Assignee: Kabushiki Kaisha Topcon, Tokyo, Japan

[21] Appl. No.: 08/927,509

[22] Filed: Sep. 11, 1997

[30] Foreign Application Priority Data

Sep. 27, 1996 [JP] Japan .................................. 8-277070

[51] Int. Cl.⁶ ................. G01C 9/02; G01C 9/18
[52] U.S. Cl. ........................... 356/247; 356/249
[58] Field of Search ................... 356/138, 148, 356/156, 248, 247, 250; 33/206, 209, 366, 377, 378, 396

[56] References Cited

U.S. PATENT DOCUMENTS

| | | | |
|---|---|---|---|
| 3,905,707 | 9/1975 | Feist et al. | 356/249 |
| 5,392,112 | 2/1995 | Nakamura | 356/139.1 |
| 5,513,001 | 4/1996 | Ohtomo et al. | 356/249 |
| 5,619,802 | 4/1997 | Rando et al. | 33/291 |
| 5,684,579 | 11/1997 | Ohtomo et al. | 356/249 |

*Primary Examiner*—Frank G. Font
*Assistant Examiner*—Michael P. Stefira
*Attorney, Agent, or Firm*—Nields, Lemack & Dingman

[57] ABSTRACT

An automatic tilt angle compensator, which comprises a sealed container for sealing at least two types of liquids to form a free interface, a light projecting system arranged to project a light beam through the free interface, an entry window for allowing the light beam to enter, reflecting means for reflecting the light beam after passing through the free interface, and an exit window for irradiating the light beam from said sealed container, wherein said entry window, said reflecting means and said exit window are always in contact with said liquid, and when the system is laid down by 90 degrees, the free interface is rotated by 90 degrees, and the light beam passing through the free interface is irradiated through the exit window in the same manner as before the rotation by 90 degrees.

7 Claims, 3 Drawing Sheets

AUTOMATIC TILT ANGLE COMPENSATOR

BACKGROUND OF THE INVENTION

The present invention relates to an automatic tilt angle compensator, which is used in survey instruments, measuring instruments, etc. to measure changes in the amount of tilting, to maintain an optical axis of an equipment in the vertical direction or in the horizontal direction or to form a light beam irradiation plane in the horizontal or vertical directions.

When there is provided an optical member, in which transparent liquid is sealed in a sealed container and two layers of gas and liquid are formed in the sealed container and in case the entire system including the optical member is tilted, the liquid is turned to wedge-like form. The wedge-like form is deformed at a constant rate with respect to the tilting of the system. If a light beam is passed through the liquid in wedge-like form, the liquid with its form changing at a constant rate with respect to the tilting of the system plays a role of a prism. As a result, an optical axis of the light beam after passing through it forms a deflection angle at a constant rate with respect to the tilting of the system. An optical axis compensator based on this principle is disclosed in each of JP-A-8-75466 and JP-A-7-19871.

The sealed container as described above contains a transparent member to allow the light beam to pass. In the automatic tilt angle compensator as described above, the transparent member of the optical member is immersed in or emerged from the sealed liquid depending upon the condition of the automatic tilt angle compensator. For this reason, even in case the transparent member is emerged from the liquid, the liquid remains and is attached on the transparent member in the state of liquid drops or liquid film. This leads to a problem that the light beam passing through the transparent member diffuses.

An optical axis passed through the liquid in wedge-like form is changed with respect to not only the change of tilting the system but also the change of liquid temperature according to environmental temperature. Because the change of liquid temperature causes the change of a refractive index of the liquid. Therefore, the change of optical axis with respect to the tilting of the system differs according to temperature condition.

In the conventional type automatic tilt angle compensator, the use of the compensator is limited to the case where the entire system is installed in almost horizontal or in almost vertical position and it is difficult to use the compensator in both conditions at the same time, i.e. in almost horizontal and in almost vertical conditions. To use the compensator in both conditions, it is necessary to use it by attaching an optical system separately prepared or the sealed container must be made movable in advance or must be assembled to suit the use at almost horizontal position or at almost vertical position. In these cases, reproducibility at the removal or assembling of the optical system is low, and accuracy is not satisfactory. Also, the cost of the parts, these parts demand high accuracy, increases.

SUMMARY OF THE INVENTION

To solve the above problems, it is an object of the present invention to provide an optical axis compensator, by which it is possible to suppress or prevent diffusion of light beam passing through an optical member and to maintain high stability and accuracy. It is another object of the present invention to provide an optical axis compensator to eliminate or reduce error caused by change of an optical axis due to temperature change even when change occurs in environmental temperature. Further, it is still another object of the present invention to provide an automatic tilt angle compensator for automatically compensating an optical axis without requiring to prepare a specific optical system and an extra mechanism capable to rearrange a part of the optical system and for using in both almost the horizontal condition and almost the vertical condition.

To attain the above objects, the automatic tilt angle compensator according to the present invention comprises a sealed container for sealing at least two types of liquids to form a free interface, a light projecting system arranged to project a light beam through the free interface, an entry window for allowing the light beam to enter, reflecting means for reflecting the light beam after passing through the free interface, and an exit window for irradiating the light beam from said sealed container, wherein said entry window, said reflecting means and said exit window are always in contact with said liquid, and when the system is laid down by 90 degrees, the free interface is rotated by 90 degrees, and the light beam passing through the free interface is irradiated through the exit window in the same manner as before the rotation by 90 degrees. Also, the present invention provides the compensator as described above, wherein the free interface is formed in a combination of a polar solvent and a non-polar solvent. Further, the present invention provides the compensator as described above, wherein an open space is maintained in a portion other than light beam in the sealed container. Also, the present invention provides a compensator as described above, wherein the sealed container comprises a flexible plane. Further, the present invention provides a compensator as described above, wherein said at least two types of liquids have refractive indices varied according to temperature in the same manner or in almost similar manner to each other. Also, the present invention provides a compensator as described above, wherein a beam expander having an angular magnification of 1/(n–n') is arranged on an optical axis of light emitted from said sealed container.

n: A refractive index of upper layer transparent liquid n': A refractive index of lower layer transparent liquid Further, the present invention provides a compensator as described above, wherein a photodetecting means for detecting a position of emitting light beam is arranged on an optical axis of light emitted from said sealed container.

In the present invention, at the time when the light beam passes through the sealed container, the light beam is allowed to pass the transparent liquid in wedge-like form, and the outgoing light beam indicates angular displacement to match the tilting of the entire system. Because the incident light beam is reflected in an inner surface of the sealed container and is irradiated, even when the total system including the optical member is rotated by 90 degrees, it is possible to allow the incident light beam to pass through the transparent liquid. Therefore, even when the entire system is rotated by 90 degrees, the outgoing light beam indicates angular displacement to match the tilting of the entire system. The optical components such as entry window, reflective member, exit window, etc. are always immersed in the liquid, and it is possible to suppress or prevent diffusion of light and to maintain high stability and accuracy of the system. Further, the open space in the sealed container or a flexible portion formed in the sealed container can absorb or offset thermal expansion or thermal shrinkage.

DETAILED DESCRIPTION OF THE PREFERRED EMBODIMENTS

Figure 1:
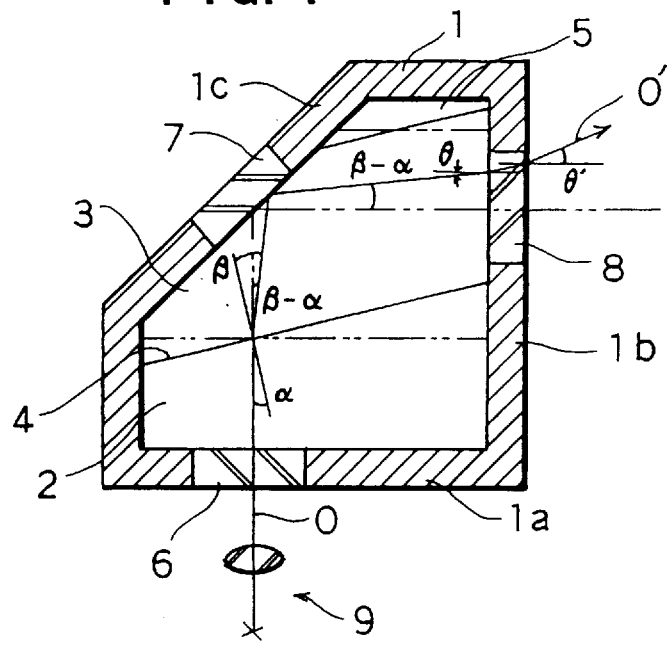
FIG. 1 is a cross-sectional view of an essential portion of an embodiment of the present invention.

In the following, description will be given on embodiments of the present invention referring to the attached drawings.

First, description will be given on an essential portion of an automatic tilt angle compensator of the present invention referring to FIG. 1 and FIG. 2.

A free interface 4 is formed in a sealed container 1, and a lower layer transparent liquid 2 and an upper layer transparent liquid 3 are sealed in the container so that an open space 5 is maintained in upper portion of the sealed container 1. The sealed container 1 comprises a horizontal bottom 1a, a vertical wall 1b running perpendicularly to the bottom 1a, and a reflective wall 1c tilted by 45 degrees with respect to the vertical wall 1b and the bottom 1a respectively. An entry window 6 is disposed on the bottom 1a, a reflective member 7 is arranged on the reflection wall 1c, and an exit window 8 is disposed on the vertical wall 1b. The entry window 6 is immersed in the lower transparent liquid 2, and the reflective member 7 and the exit window 8 are immersed in the upper layer transparent liquid 3. A light projecting system 9 is arranged in opposite to the entry window 6 so that a light beam irradiated from the light projecting system 9 passes through the entry window 6 and enters the lower layer transparent liquid 2.

The lower layer transparent liquid 2 or the upper layer transparent liquid 3 is a combination of a polar solvent and a non-polar solvent, e.g. a combination of a fluorine type inactive solution and a non-polar protic solvent, i.e. acetonitrile or N-methyl formamide or pyridine or dimethyl sulfoxide. These substances can dissolve electrolyte such as potassium iodide or potassium chloride and the refractive indices may be changed.

When environmental temperature changes, the refractive index of the liquid also changes. By selecting two types of liquids, which have refractive indices changing in the same manner or in almost similar manner to each other depending on temperature, it is possible to maintain change of the optical axis with respect to the tilting of the entire system in the same state or in almost similar state when environmental temperature changes.

Also, if the open space 5 is disposed at a position out of the optical axis for the case where the volume of the liquid shrinks as temperature changes, it is possible to decrease the change of internal pressure due to expansion or shrinkage of the liquid and to suppress the change of viscosity of the liquid and to maintain durability of the container. Instead of providing the open space 5, if flexibility is given to a part of the container not in contact with the free interface 4 and the change of internal pressure due to expansion or shrinkage of the liquid is absorbed or compensated by deformation of said part of the container, it is possible to suppress the change of viscosity of the liquid or to maintain durability of the container similarly to the case when the open space 5 is provided.

In the following, description will be given on automatic compensation in order to maintain an optical axis of an automatic tilt angle compensator in the horizontal direction.

Here, to facilitate explanation on the change of an optical axis when the main unit is tilted, explanation is given under the assumption that the free interface is tilted.

As shown in FIG. 1, when liquid surface is tilted at an angle of $\alpha$, amount of change of an optical axis (deflection angle of the optical axis) after the light passes through the free interface 4 is given by:

$$a = \beta - \alpha$$
$$\beta = n/n' \cdot \alpha \quad (1)$$

where n: A refractive index of upper layer transparent liquid
n': A refractive index of lower layer transparent liquid Because the optical axis directed toward the exit window 8 has a deflection angle of "a", deflection angle $\theta$ of the optical axis inside the exit window 8 is given as:

$$\theta = n'/n'' \cdot a \quad (2)$$
$$= n'/n'' \cdot (\beta - \alpha)$$

The deflection angle $\theta'$ of the optical axis after passing through the exit window 8 is:

$$\theta' = n'' \cdot \theta \quad (3)$$
$$= n''((n'/n'') \cdot (\beta - \alpha))$$
$$= n'(\beta - \alpha)$$
$$= n'((n/n') \cdot \alpha - \alpha)$$
$$= \alpha(n - n')$$

When $\theta'' = \alpha$, an outgoing optical axis $O'$ is always maintained in parallel to the free interface 4 regardless of the tilting of the main unit.

Therefore, if a beam expander (not shown) having an angular magnification of 1/(n−n') on the outgoing optical axis 603 ' is disposed, it is possible to obtain the optical axis, which is always maintained in the horizontal direction regardless of the tilting of the main unit.

Figure 2:
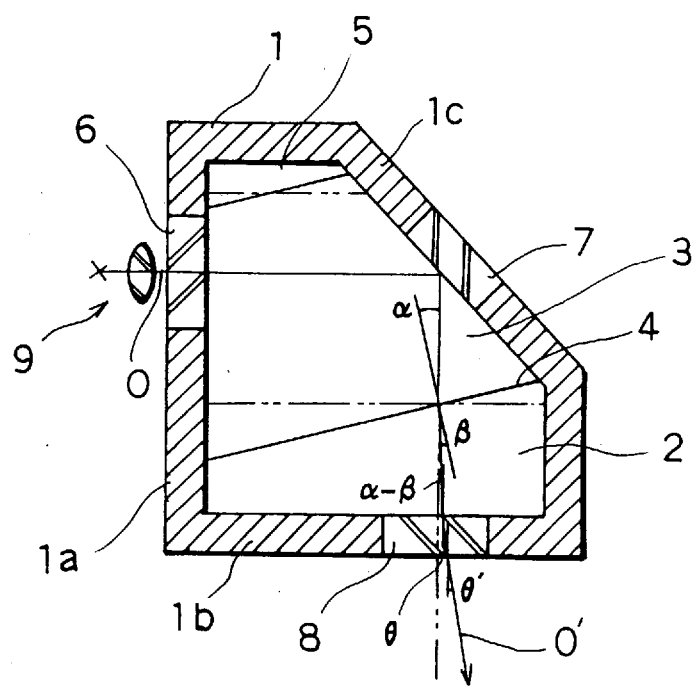
FIG. 2 is a cross-sectional view of an essential portion of the embodiment of the invention when the entire system is rotated by 90 degrees.

FIG. 2 shows the entire system rotated by 90 degrees. The two transparent liquids 2 and 3 are also rotated by 90 degrees, and the free interface 4 is also rotated by 90 degrees around the center of gravity. The optical axis from the light projecting system 9 is reflected by the reflective member 7 and passes through the free interface 4. The amount of change "a" of the optical axis in this case is:

$$a = \alpha - \beta$$
$$\beta = (n'/n) \cdot \beta \quad (4)$$

Because the optical axis directed toward the exit window 8 has a deflection angle of "a", deflection angle $\theta$ of the optical axis in the exit window 8 is given by:

$$\theta = n/n'' \cdot a \quad (5)$$
$$= n/n'' \cdot (\alpha - \beta)$$

Deflection angle θ' of optical axis after passing through the exit window 8 is:

$$\theta' = n'' \cdot \theta \quad (6)$$
$$= n''((n/n'') \cdot (\alpha - \beta))$$
$$= n(\alpha - \beta)$$
$$= n(\alpha - (n'/n)\alpha)$$
$$= \alpha(n - n')$$

Therefore, it is the same as the equation (3), and the outgoing optical axis is compensated by the beam expander and it is possible to obtain an optical axis, which can always be maintained in the vertical direction regardless of the tilting of the main unit.

As described above, when environmental temperature changes, refractive indices of the lower layer transparent liquid 2 and the upper layer transparent liquid 3 are changed. By selecting the liquids having refractive indices which vary according to temperature in the same manner or in almost similar manner to each other, it is possible to eliminate or reduce error due to temperature change.

The open space 5 absorbs or compensates expansion or shrinkage of the lower layer transparent liquid 2 and the upper layer transparent liquid 3 due to thermal change.

Figure 3:
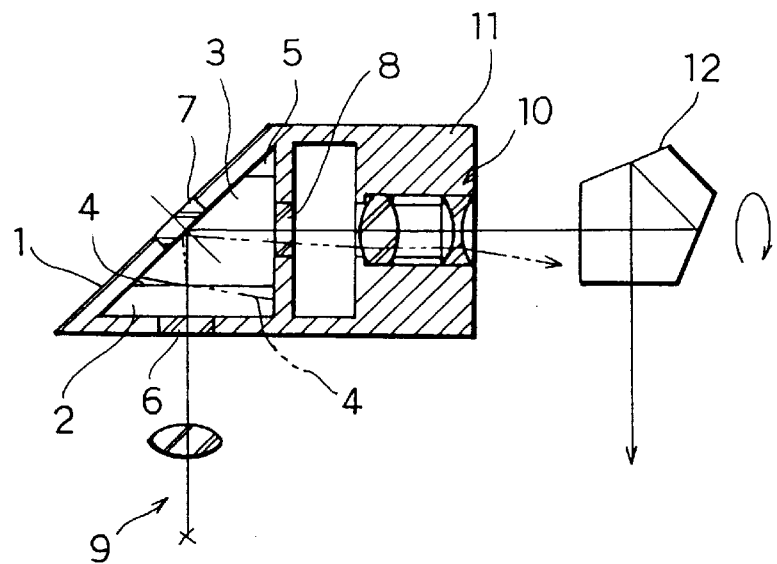
FIG. 3 is to explain the case where the compensator of the present invention is applied to a rotary laser irradiating device.

FIG. 3 shows an example where the automatic tilt angle compensator is applied to a rotary laser irradiation device.

On opposite side to the exit window 8 and on a reflection optical axis of the reflective member 7, a beam expander 10 is disposed. The beam expander 10 is incorporated in a housing 11, which is integrated with the sealed container 1. On opposite side of the beam expander 10, a rotary pentagonal prism 12 is rotatably arranged on the optical axis of the beam expander 10, and the rotary pentagonal prism 12 is to be rotated by a rotary driving unit such as a motor (not shown).

A predetermined light beam from the light projecting system 9, e.g. a laser beam, entering the sealed container 1 passes through the lower layer transparent liquid 2 and the free interface 4. Then, it is reflected by the reflective member 7 in the upper layer transparent liquid 3 and is emitted from the exit window 8. The reflected laser beam irradiated from the beam expander 10 is deflected in the vertical direction and irradiated. When the rotary pentagonal prism 12 is rotated by the rotary driving unit (not shown), a vertical laser beam irradiation plane is formed by the irradiating laser beam.

When the entire system is tilted and the free interface 4 is at the position as shown by two-dot chain line in the figure, an incident light beam is also directed as shown by two-dot chain line in the figure. After passing through the exit window 8, the light beam is compensated by the beam expander 10 and its irradiating direction is in parallel to the free interface 4. It is then deflected by the rotary pentagonal prism 12, and the laser beam irradiated by rotary irradiation forms a vertical plane.

Figure 4:
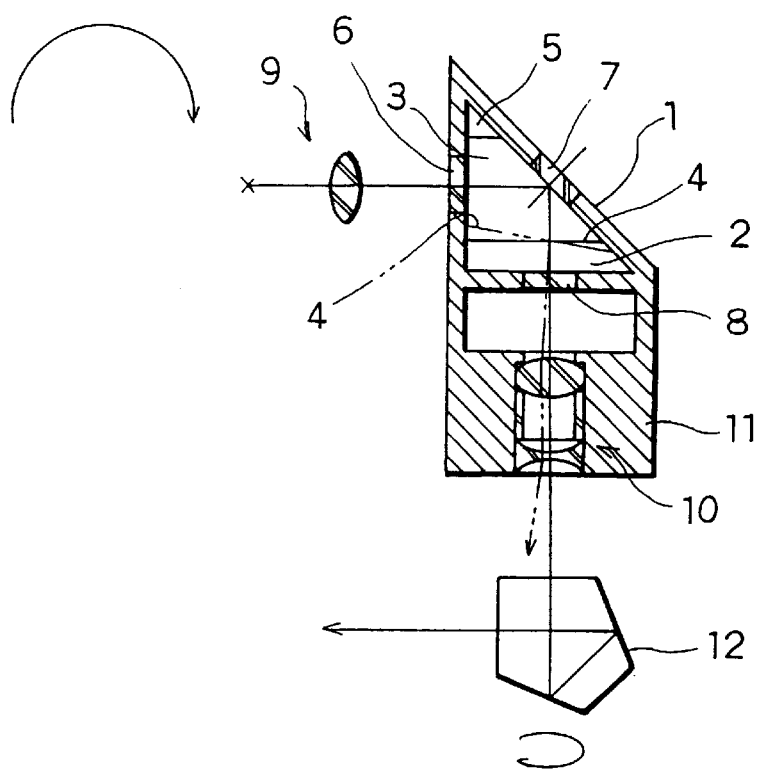
FIG. 4 is to explain the case when the entire system is rotated by 90 degrees in the rotary laser irradiating device.

FIG. 4 shows the case where the entire system is rotated by 90 degrees in the rotary laser irradiation device as described above. The laser beam entering in the horizontal direction from the light projecting system 9 enters the upper layer transparent liquid 3 and is reflected by the reflective member 7 in the upper layer transparent liquid 3. Then, it passes through the lower layer transparent liquid 2 and the exit window 8 and is compensated by the beam expander 10. Further, it enters the rotary pentagonal prism 12 from the vertical direction and is irradiated after being deflected in the horizontal direction by the rotary pentagonal prism 12. As the rotary pentagonal prism 12 is rotated, a horizontal irradiation plane is formed. Similarly in the case shown in FIG. 3, two-dot chain line in FIG. 4 indicates a variation of the free interface 4 with respect to the sealed container 1 when the entire system is tilted, i.e. it indicates change of the optical axis of the laser beam.

Figure 5:
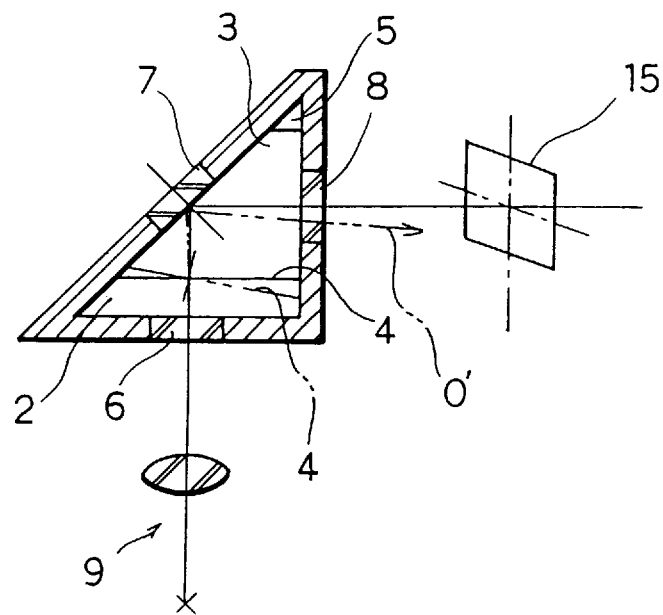
FIG. 5 represents a cross-sectional view of another embodiment of the present invention.

FIG. 5 shows the automatic tilt angle compensator of the present invention applied to an angle detector. Here, the beam expander 10 is not used, and a planar photodetection element 15 is disposed opposite to the exit window 8. As described above, the light beam passes through the lower layer transparent liquid 2 and is reflected by the reflective member 7, and the direction of the optical axis O' of the reflected light beam is changed according to the tilting of the free interface 4 with respect to the incident optical axis. Therefore, by detecting the irradiating position of the outgoing light beam on the planar photodetection element 15, it is possible to detect the deflection angle of the optical axis, i.e. the tilting of the entire system.

Figure 6:
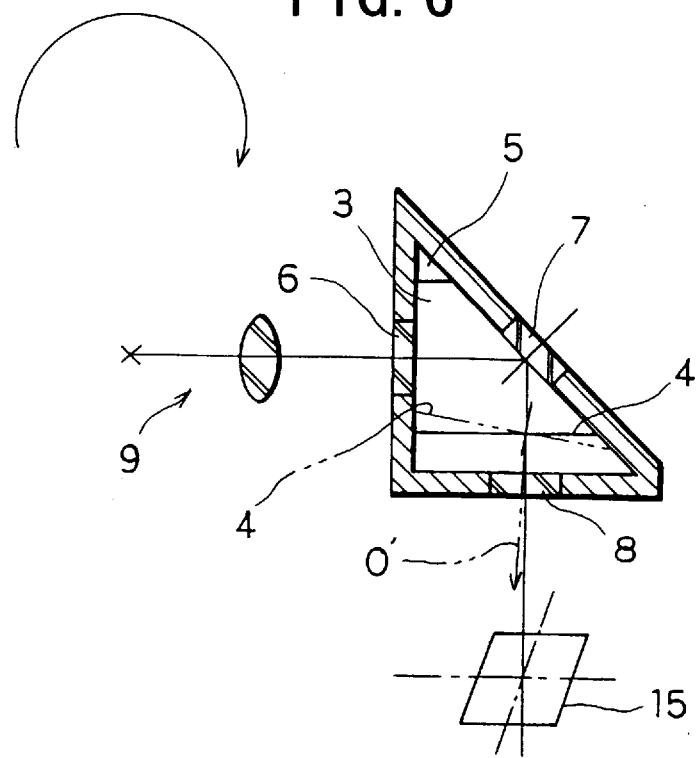
FIG. 6 is a cross-sectional view of an essential portion of said another embodiment when the entire system is rotated by 90 degrees.

FIG. 6 represents the automatic tilt angle compensator of the present invention rotated by 90 degrees. Under this condition, the outgoing light beam is irradiated in the vertical direction. By detecting the irradiating position to the planar photodetection element 15, deviation of the outgoing optical axis O' with respect to the vertical line can be detected, i.e. it is possible to detect the tilting of the entire system.

As the planar photodetection element 15, a 4-division photoelectric element, or other CCD element or PSD element may be used.

In this application example again, the entry window 6, the reflective member 7, and the exit window 8 are always immersed in the lower layer transparent liquid 2 or the upper layer transparent liquid 3. As a result, the liquid remains in the transparent member, and diffusion of the light beam caused by the attached liquid can be prevented.

As described above, the outgoing light beam passing through the sealed container indicates angular displacement corresponding to the tilting of the entire system. Because the incident light beam is reflected in the sealed container and is irradiated, the incident light beam can pass through the transparent liquid, and the outgoing light beam indicates angular displacement corresponding to the tilting of the entire system even when the system is rotated by 90 degrees. Because optical components such as the entry window, the reflective member, the exit window, etc. are always immersed in the liquid, it is possible to prevent diffusion of light without worrying about the attachment of the liquid drops or the liquid film, and this contributes to high stability and accuracy of the system.

What we claim are:

1. An automatic tilt angle compensator, comprising a sealed container for sealing at least two types of liquids which have different refractive indexes and form a free interface between said two types of liquids, a light projecting system arranged to project a light beam through said free interface, an entry window for allowing the light beam to enter, reflecting means for reflecting the light beam after passing through said free interface, and an exit window for irradiating the light beam from said sealed container, wherein said entry window, said reflecting means and said exit window are each always in contact with one of said liquids, and when said sealed container and said light projecting system are rotated by 90 degrees, said free interface is rotated by 90 degrees, and the light beam passing through said free interface is irradiated through said exit window in the same manner as before the rotation by 90 degrees.

2. An automatic tilt angle compensator according to claim 1, wherein said free interface is formed in a combination of a polar solvent and a non-polar solvent.

3. An automatic tilt angle compensator according to claim 1, wherein said sealed container has an open space where the expansion and constriction of said liquids is accommodated.

4. An automatic tilt angle compensator according to claim 1, wherein said sealed container has a flexible plane.

5. An automatic tilt angle compensator according to claim 1, wherein said at least two types of liquids have refractive indices varied according to temperature in the same manner or in almost similar manner to each other.

6. An automatic tilt angle compensator according to claim 1, wherein said reflecting means comprises a reflection optical axis, said automatic tilt angle compensator further comprising a beam expander having an angular magnification of $1/(n-n')$ arranged on said reflection optical axis, and wherein said light beam is emitted in a horizontal or vertical direction through said beam expander, wherein: n is the refractive index of a first of said two types of liquids and n' is the refractive index of a second of said two types of liquids.

7. An automatic tilt angle compensator according to claim 1, further comprising photodetecting means spaced from said exit window for detecting said light beam and for detecting a deviation angle of an optical axis of the irradiated light beam.

* * * * *